(12) United States Patent
Inagaki et al.

(10) Patent No.: US 7,943,253 B2
(45) Date of Patent: May 17, 2011

(54) SEALED BATTERY AND MANUFACTURING METHOD THEREFOR

(75) Inventors: Kenji Inagaki, Moriguchi (JP); Hiroshi Hosokawa, Moriguchi (JP); Takashi Kondou, Moriguchi (JP); Satoshi Yoshida, Kurashiki (JP); Yasuhiro Yamauchi, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 97 days.

(21) Appl. No.: 12/147,017

(22) Filed: Jun. 26, 2008

(65) Prior Publication Data

US 2009/0004562 A1    Jan. 1, 2009

(30) Foreign Application Priority Data

Jun. 29, 2007  (JP) ................. 2007-172026
May 13, 2008  (JP) ................. 2008-126529

(51) Int. Cl.
*H01M 2/26* (2006.01)
*H01M 6/12* (2006.01)
*H01M 2/02* (2006.01)

(52) U.S. Cl. ....... 429/161; 429/162; 429/178; 29/623.4; 29/623.1

(58) Field of Classification Search .......... 429/122–347; 29/623.1–623.5
See application file for complete search history.

(56) References Cited

U.S. PATENT DOCUMENTS

| | | | | |
|---|---|---|---|---|
| 4,125,680 | A | * | 11/1978 | Shropshire et al. ............. 429/4 |
| 6,040,086 | A | * | 3/2000 | Yoshida et al. ............. 429/211 |
| 2007/0117009 | A1 | * | 5/2007 | Yamauchi et al. ............. 429/160 |
| 2009/0004561 | A1 | * | 1/2009 | Nansaka et al. ............. 429/185 |
| 2009/0087736 | A1 | * | 4/2009 | Taniguchi et al. ............. 429/185 |

FOREIGN PATENT DOCUMENTS

| | | | | |
|---|---|---|---|---|
| JP | 2001006654 | A | * | 1/2001 |
| JP | 2001-160387 | A | | 6/2001 |
| JP | 2002-008708 | A | | 1/2002 |
| JP | 2003187778 | A | * | 7/2003 |
| JP | 2006-310254 | A | | 11/2006 |

(Continued)

OTHER PUBLICATIONS

Machine Translation of JP 2003-187778 to Yoshida originally published Jul. 2003.*

(Continued)

*Primary Examiner* — Basia Ridley
*Assistant Examiner* — Jonathan G Leong
(74) *Attorney, Agent, or Firm* — Westerman, Hattori, Daniels & Adrian, LLP

(57) ABSTRACT

A sealed battery according to an aspect of the invention includes: a flat electrode assembly 11 having a plurality of copper or copper alloy negative electrode substrate exposed portions 15 at one end; and a copper or copper alloy collector $18_1$ attached to one side of the exposed portions 15 and a copper or copper alloy collector receiving part $18_2$ attached to the other side. The collector $18_1$ and the collector receiving part $18_2$ respectively include: a planar part 18a including a part in contact with and resistance-welded to the exposed portions 15; a first bent part 18b extending from the planar part 18a and bent at the bottom side of the exposed portions 15 into a direction away from the substrates; and a second bent part 18c provided at the leading side of the negative electrode substrate exposed portions 15.

10 Claims, 13 Drawing Sheets

FOREIGN PATENT DOCUMENTS

JP   2007-053002 A   3/2007

OTHER PUBLICATIONS

Machine Translation of JP 2002-008708 to Tomoyasu Takeuchi et al. originally published Jan. 2002.*

Machine Translation of JP 2001-006654 to Nemoto et al. originally published Jan. 2001.*

Copending U.S. Appl. No. 12/473,517 to Nansaka et al. filed May 2009.*

* cited by examiner

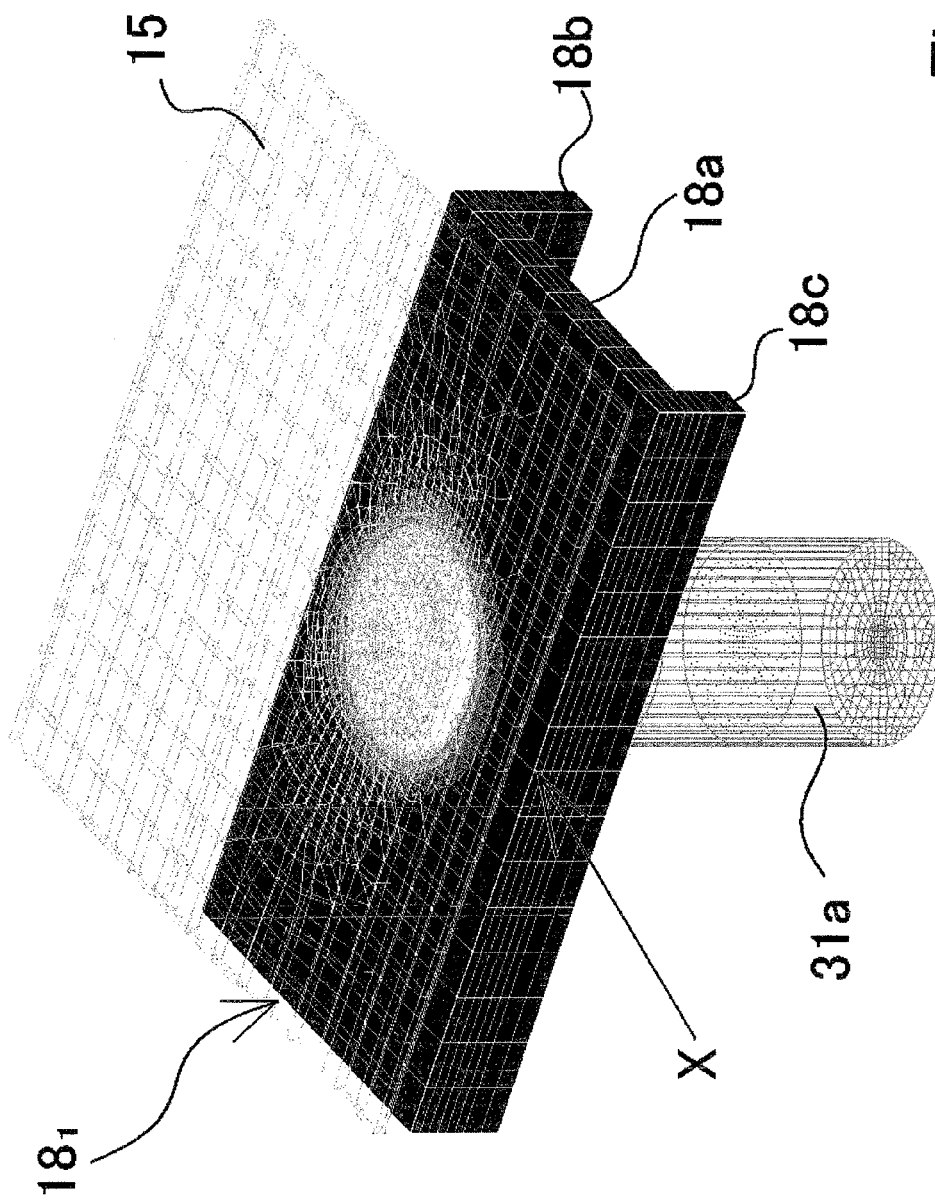

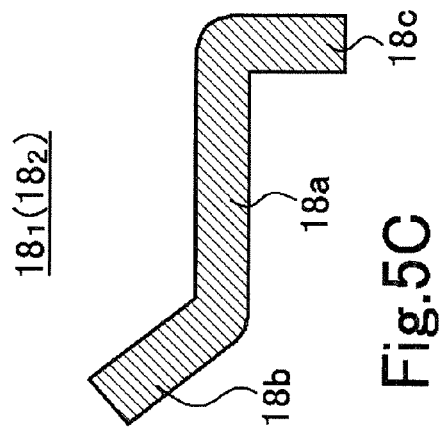
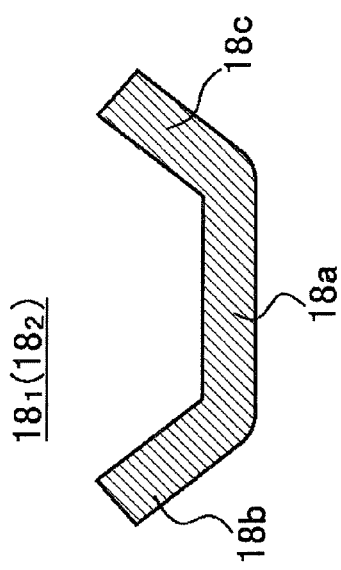
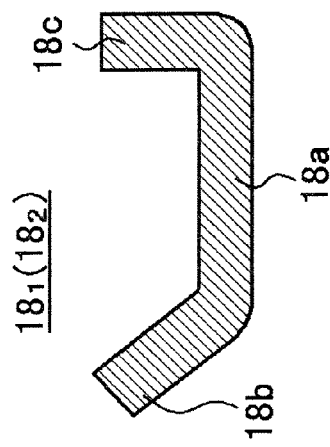

SEALED BATTERY AND MANUFACTURING METHOD THEREFOR

TECHNICAL FIELD

The present invention relates to a sealed battery including a flat electrode assembly produced by winding or laminating belt-shaped positive and negative electrodes with a belt-shaped separator therebetween and a manufacturing method therefor, and particularly to a sealed battery used in an application requiring a large current, such as hybrid electric vehicles and pure electric vehicles, and a method for manufacturing such battery.

BACKGROUND

Curbs on emissions of carbon dioxide and other substances have been strengthened against a background of growing movements for environmental protection, and in the automobile world there is now vigorous development of electric vehicles (EVs) and hybrid electric vehicles (HEVs) alongside vehicles using fossil fuels such as gasoline, diesel oil and natural gas. In addition, the soaring prices of fossil fuels in recent years has acted to spur on the development of EVs, HEVs and the like.

The batteries used for such EVs, HEVs and the like are generally nickel-hydrogen secondary batteries or lithium ion secondary batteries. What is now being required of such vehicles is not only environmental compatibility, but also basic performance as automobiles, in other words, elevated driving capabilities. Therefore it is necessary not simply to enlarge the battery capacity, but also to increase the battery output, which exerts large effects on an automobile's acceleration and hill-climbing performances. However, when discharge of high output is implemented, large current will flow in the battery, and as a result there will be large heat-up due to contact resistance between the substrates and the collectors of the electrode assembly. Thus, batteries for EVs and HEVs are required not only to be large-sized and large capacity, but also to afford large current. Accordingly, in order to prevent electricity loss inside the battery and thereby reduce heat emission, many improvements have been carried out with regard to lowering the internal resistance by preventing welding faults between the substrates and collectors of the electrode assembly.

There exist the methods of mechanical caulking, welding and the like for electrically joining the substrates and collectors of the electrode assembly. Welding, which is joining by fusion, is appropriate as the electrical collection method for batteries of which high output is required. Also, in order to effect low resistance, the material used for the electrode assembly of a lithium ion secondary battery is copper (copper alloy) or aluminum (aluminum alloy), which however have the characteristics of low electrical resistance and high thermal conductivity, so that extremely large amounts of energy are required in order to weld them.

The following methods have long been known as methods for welding together the substrates and collectors of the electrode assembly:

(1) Laser welding (see JP-A-2001-160387)
(2) Ultrasonic welding (see JP-A-2007-053002)
(3) Resistance welding (see JP-A-2006-310254)

With the laser welding method, a high-energy laser beam is required because of a high reflectivity of about 90% of copper or copper alloy and of about 80% of aluminum or aluminum alloy with respect to yttrium-aluminum-garnet (YAG) laser light that is widely used to weld metals is high. There also exist the problems that when copper or copper alloy is laser-welded, the weldability varies greatly depending on the condition of the surfaces, and that the occurrence of spatter is unavoidable, as in laser welding of other materials.

With ultrasonic welding too, large amounts of energy are required because the thermal conductivity of the copper (copper alloy) or aluminum (aluminum alloy) welded material is high. Also, a negative electrode mixture may be dislodged by the ultrasonic vibration during welding. Accordingly, in the invention disclosed in JP-A-2007-053002, the electrode assembly, which is a generation element, is compressed during ultrasonic welding, so that dislodged negative electrode mixture will not enter inside the electrode assembly.

Further, with resistance welding, due to the copper (copper alloy) or aluminum (aluminum alloy) welded material having low electrical resistance and high thermal conductivity there exist the problems that large current needs to be input in a short time, that fusion bonding of the collectors and the bolt poles sometimes occurs during welding, and that melting or spark generation may occur at places other than the welds.

Thus, the three welding methods have their merits and drawbacks. In the interests of productivity and economy however, the resistance welding method, which has long been used as a method for welding between metals, will preferably be employed. But, especially in order to resistance-weld the collectors or collector receiving parts in a wound electrode assembly (see JP-A-2002-008708) of EV and HEV application prismatic batteries, which have exposed portions of positive electrode substrates at one end and of negative electrode substrates at the other, a great deal of welding energy is necessary in order to effect a firm weld, since the wound electrode assembly has a large number of stacked layers. Moreover, when the welding energy is rendered large for resistance welding, sometimes edge parts of the power collectors or collector receiving parts become molten or spark generation may occur at the edge parts, and an electrode bar for resistance welding may be fusion-bonded to the collectors or collector receiving parts.

Thus, when edge parts of the collectors or collector receiving parts become molten or a spark is generated at the edge parts, the parts are discolored and conductive metal particles generated by the molten metal or the spark may enter the inside of the electrode assembly to cause internal short-circuits. Further, since the edge parts of the collectors or collector receiving parts and a bottom side (a side to which an active material mixture is applied) of the substrates usually come close to each other, when the edge parts of the collectors or collector receiving parts become molten or a spark is generated at the edge parts, the bottom side (a side to which an active material mixture is applied) of the substrates may also be damaged. Further, when the electrode bar for resistance welding and the collectors or collector receiving parts are fusion-bonded to each other, a large amount of energy becomes required to separate the electrode bars and the collectors or collector receiving parts.

SUMMARY

An advantage of some aspects of the present invention is to provide a sealed battery including a flat electrode assembly in which a plurality of positive electrode substrates are exposed at one end and a plurality of negative electrode substrates are exposed at the other end, and a collector and a collector receiving part which are resistance-welded to both sides of at least one of the plurality of positive electrode substrates and the plurality of negative electrode substrates, wherein there is no molten trace at an edge part, no trace of spark generation, and no fusion-bonded trace with an electrode bar for resistance welding in the collector or collector receiving part, the substrates are not damaged, and the sealed battery has highly reliable resistance welds; and a method for manufacturing such battery.

According to an aspect of the invention, a sealed battery includes: a flat electrode assembly having a plurality of positive electrode substrates exposed at one end and a plurality of negative electrode substrates exposed at the other end; and a collector and a collector receiving part which are attached to both sides of at least one of the plurality of positive electrode substrates and the plurality of negative electrode substrates. At least one of the positive electrode substrates and the negative electrode substrates, the collector and the collector receiving part respectively are made of copper or a copper alloy or made of aluminum or an aluminum alloy. The collector and the collector receiving part respectively include: a planar part including a part in contact with and resistance-welded to the corresponding substrates; a first bent part extending from the planar part and bent at the bottom side of the substrates into a direction away from the substrates; and a second bent part provided at the leading side of the substrates.

In the sealed battery of the present aspect of the invention, it is necessary that at least one of the substrates, the power collector and the collector receiving part are made of copper or a copper alloy or made of aluminum or an aluminum alloy. Since particularly copper (copper alloy) and aluminum (aluminum alloy) have a low electrical resistance and a high thermal conductivity among widely used conductive metals, during the resistance welding thereof, a particularly large current has to be applied. Therefore, in the collector or collector receiving part, places other than the welds are likely to become molten and spark is likely to be generated at the edge part. However, in the sealed battery of the above arrangement, since the collector and the collector receiving part each include a planar part in contact with and resistance-welded to the corresponding substrates, a first bent part extending from the planar part and bent at the bottom side of the substrates into a direction away from the substrates, and a second bent part provided at the leading side of the substrates, the first bent part and the second bent part serve as a radiating fin. Therefore, even when the substrates, the collector and the collector receiving part respectively are made of copper or a copper alloy or made of aluminum or an aluminum alloy, the melting of an edge part of the collector or the collector receiving part during resistance welding can be prevented, and the fusion bonding between the electrode bars for resistance welding and the collector or collector receiving part can be prevented.

Here, the collector and collector receiving part have a thickness of preferably 0.1 to 5 mm. When the thickness is less than 0.1 mm, the collector and collector receiving part become molten over a wide region thereof during resistance welding, which is not preferred. On the other hand, when the thickness is more than 5 mm, they are unlikely to be molten during resistance welding, and consequently, a larger current density becomes necessary, which is not preferred. Further, so long as the first bent part and the second bent part respectively have a length of 1 mm or more, predetermined advantageous effects can be obtained. The upper limit of the length is determined depending on the space volume of the sealed battery. However, too large a length is not preferred due to potential short-circuits between the sealed battery and the battery outer can.

In addition, in the sealed battery of the above arrangement, the edge parts of the collector and the collector receiving part respectively are allocated at positions away from each other, moreover at positions away from the substrates, so that the generation of the spark from the edge parts of the collector and the collector receiving part is prevented. Further, the first bent parts of the collector and the collector receiving part are bent at the bottom side of the substrates in a direction away from the substrates and the bent parts are rounded off, so that the substrates is rarely damaged, and the bent parts serve as a positioning means on the substrate side. Therefore, the displacement of the collector or the collector receiving part is unlikely to occur.

Therefore, according to the present aspect of the invention, a sealed battery in which the collector and the receiving part collector have no discoloration due to the melting of their edge parts or spark and no welding trace with the electrode bars for resistance welding, and moreover the damage of the substrates and the displacement of the collector or the collector receiving part are unlikely to occur, as well as highly reliable resistance welds can be obtained.

Further, in the sealed battery of the above arrangement, it is preferred that the collector and the collector receiving part have the same thickness and the same shape at the part in contact with the corresponding substrates.

Accordingly, the collector and the collector receiving part have the same thickness and the same shape, so that a heat balance between the collector and the collector receiving part can be equal. Therefore, particularly the foregoing advantages of the above arrangement are advantageously exhibited.

Further, in the sealed battery of the above arrangement, it is preferred that the planar part of at least one of the collector and the collector receiving part be provided with a protrusion projecting toward the other planar part.

The protrusion is generally also referred to as a "projection". Since current will concentrate in the protrusion during resistance welding, the reactive current which is not used in resistance welding is reduced, and resistance welding can be carried out effectively and robustly even when the substrates, the collectors and the collector receiving parts are made of copper (copper alloy) or aluminum (aluminum alloy) having a low electrical resistance and a high thermal conductivity. Accordingly, with such an aspect, a sealed battery having higher reliability of the welds while exhibiting the foregoing advantages of the above arrangement can be obtained.

Further, in the sealed battery of the above arrangement, it is preferred that the planar parts of the collector and the collector receiving part each have at least two resistance welds.

With the sealed battery having such an arrangement, the inner resistance between the substrates and the collectors can be reduced. Therefore, a sealed battery capable of providing a larger current while exhibiting the foregoing advantages of the above arrangement can be obtained.

Further, with the above arrangement, it is preferred that the sealed battery be a lithium ion non aqueous electrolyte secondary battery.

In the lithium ion nonaqueous electrolyte secondary battery, the negative electrode substrates made of copper or a copper alloy are used for general purposes. Therefore, the sealed battery exhibits remarkably the foregoing advantages of the above-described aspect of the invention. Here, a lithium ion nonaqueous electrolyte secondary battery including positive electrode substrates and collectors for the positive electrode which are made of aluminum or an aluminum alloy is used for general purposes, and also by welding the positive electrode substrates with the collectors for the positive electrode, the same advantageous effects can be obtained.

According to another aspect of the invention, a method for manufacturing a sealed battery includes the following processes (1) to (3):

(1) forming a flat electrode assembly having exposed portions of a plurality of aluminum or aluminum alloy positive electrode substrates at one end and a plurality of copper or copper alloy negative electrode substrates at the other end, (2) arranging a collector and a collector receiving part each made of one of copper, copper alloy, aluminum, and aluminum alloy and each including: a planar part; a first bent part extending from the planar part and bent at the bottom side of the substrates into a direction away from the corresponding substrates; and a second bent part provided at the leading side of the substrates, so as to provide the collector at one end and the collector receiving part at the other end of welds in the exposed portions of at least one of the positive electrode substrates and the negative electrode substrates with each planar part coming in contact with the substrates, and (3) resistance-welding the collector and the collector receiving part by applying a current between electrode bars for resistance welding with the collector and the collector receiving part depressed to each other with the electrode bars for resistance welding.

With the method for manufacturing a sealed battery according to such an aspect, a sealed battery exhibiting the foregoing advantages of the above arrangement can be easily produced.

With such manufacturing method, it is preferred that, in the above (2) process, the planar part of at least one of the collector and the collector receiving part be provided with a protrusion projecting toward the other planar part, and in the above (3) process, the resistance welding be performed by applying a current having a current density of 100 A/mm$^2$ or more.

According to the method for manufacturing a sealed battery in such an aspect, even when the substrates, the collector and the collector receiving part are made of copper (copper alloy) or aluminum (aluminum alloy) which are known to have a low electrical resistance and an extremely high thermal conductivity, they can be advantageously resistance-welded. Here, in the case where the substrates, the collector and the collector receiving part respectively are made of copper or a copper alloy or made of aluminum or an aluminum alloy, when the current density during resistance welding is less than 100 A/mm$^2$, due to a low emitted heat, the resistance welding cannot be performed advantageously. The larger the current density is, the more advantageously resistance welding can be performed. However, the optimal current density during resistance welding varies depending on the size of the collector and the collector receiving part. Moreover, too large a current density is uneconomic, and the collector and the collector receiving part may be excessively fusion-bonded or fusion bonding between the electrode bars for resistance welding and the collector or the collector receiving part may occur. Therefore, the upper limit of the current density during resistance welding may be determined experimentally.

BRIEF DESCRIPTION OF THE DRAWINGS

The invention will be described with reference to the accompanying drawings, in which the same numerals refer to the same elements throughout.

FIG. 4 is a computer simulation view showing the temperature distribution of resistance welds in the sealed battery according to the first embodiment viewed from below.

FIGS. 5A to 5C are cross sectional views showing a collector and collector receiving part applicable to the invention.

BEST MODE FOR CARRYING OUT THE INVENTION

Exemplary embodiments of the invention will now be described with reference to the accompanying drawings and to working examples and comparative examples. It should be understood however that the embodiments below are intended by way of illustrative examples of methods for manufacturing a sealed nonaqueous electrolyte secondary battery that carry out the technical concepts of the invention, and are not intended by way of limiting the invention to these particular manufacturing methods for a sealed nonaqueous electrolyte secondary battery. The invention could equally well be applied to yield other embodiments within the scope and spirit of the claims.

Figure 1:
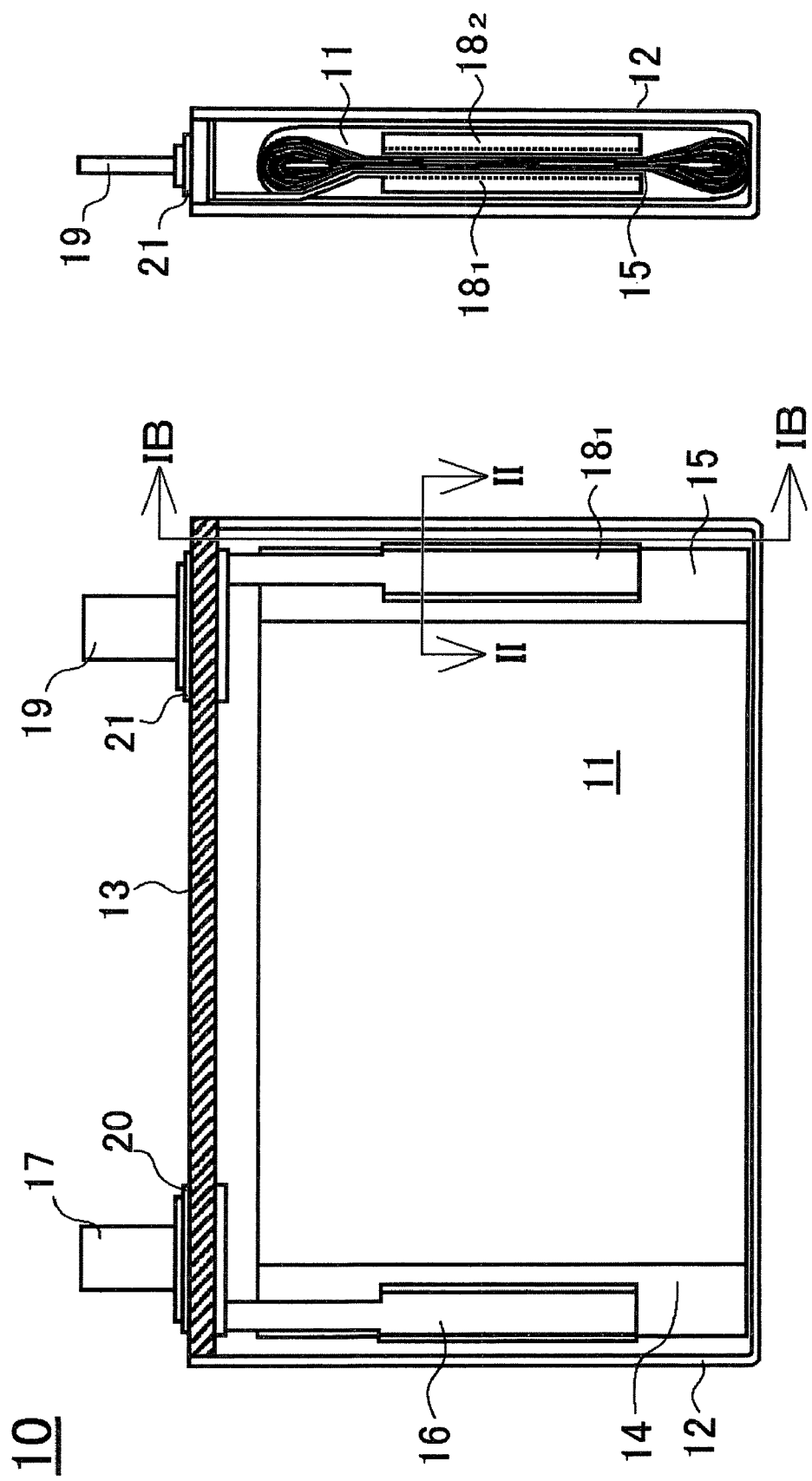
FIG. 1A is a front view illustrating the internal structure of a sealed battery according to an embodiment of the present invention.
FIG. 1B is a cross-sectional view along line IB-IB in FIG. 1A.
Figure 2:
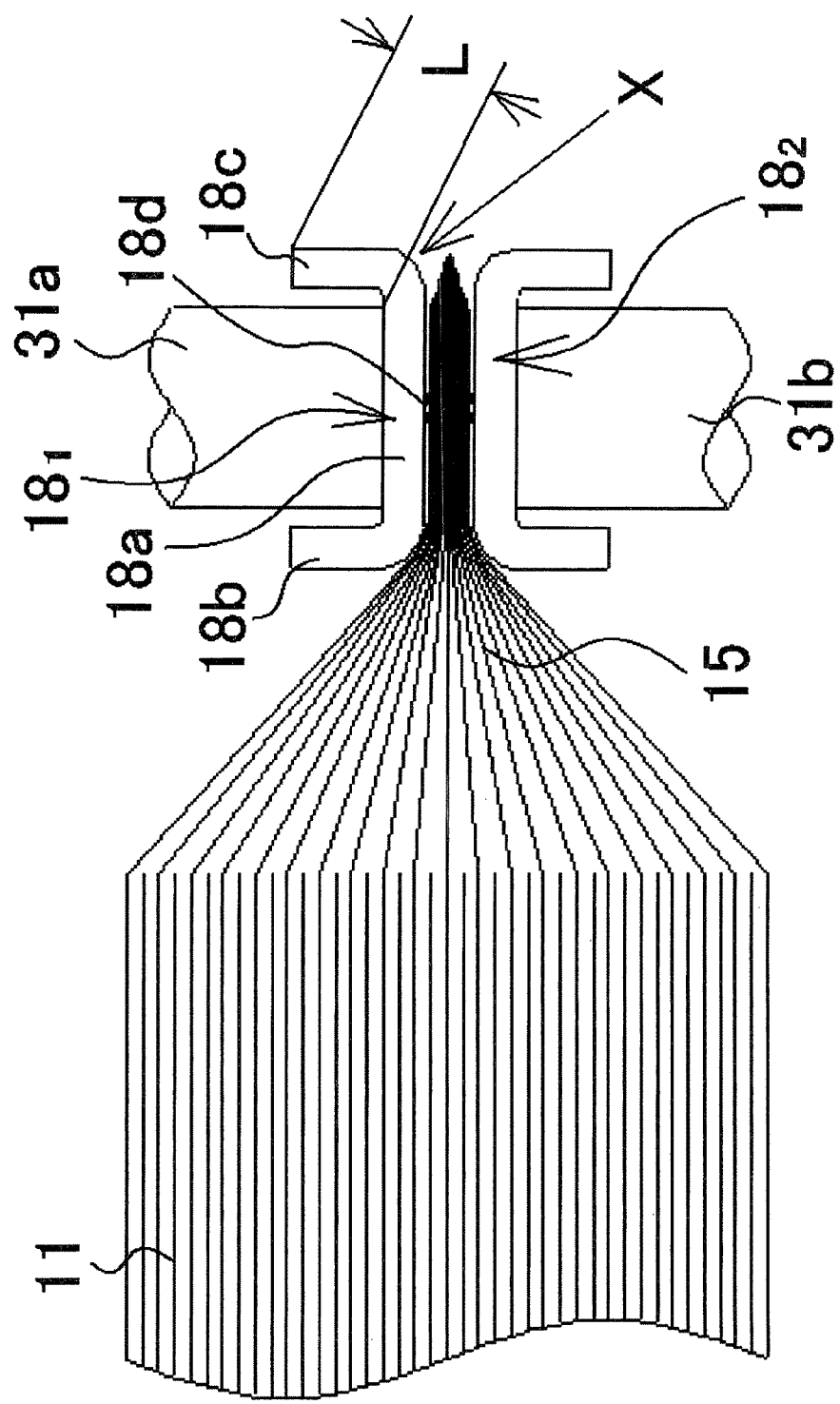
FIG. 2 is an enlarged cross-sectional view, along line II-II in FIG. 1A, of the sealed battery according to the embodiment.
Figure 3:
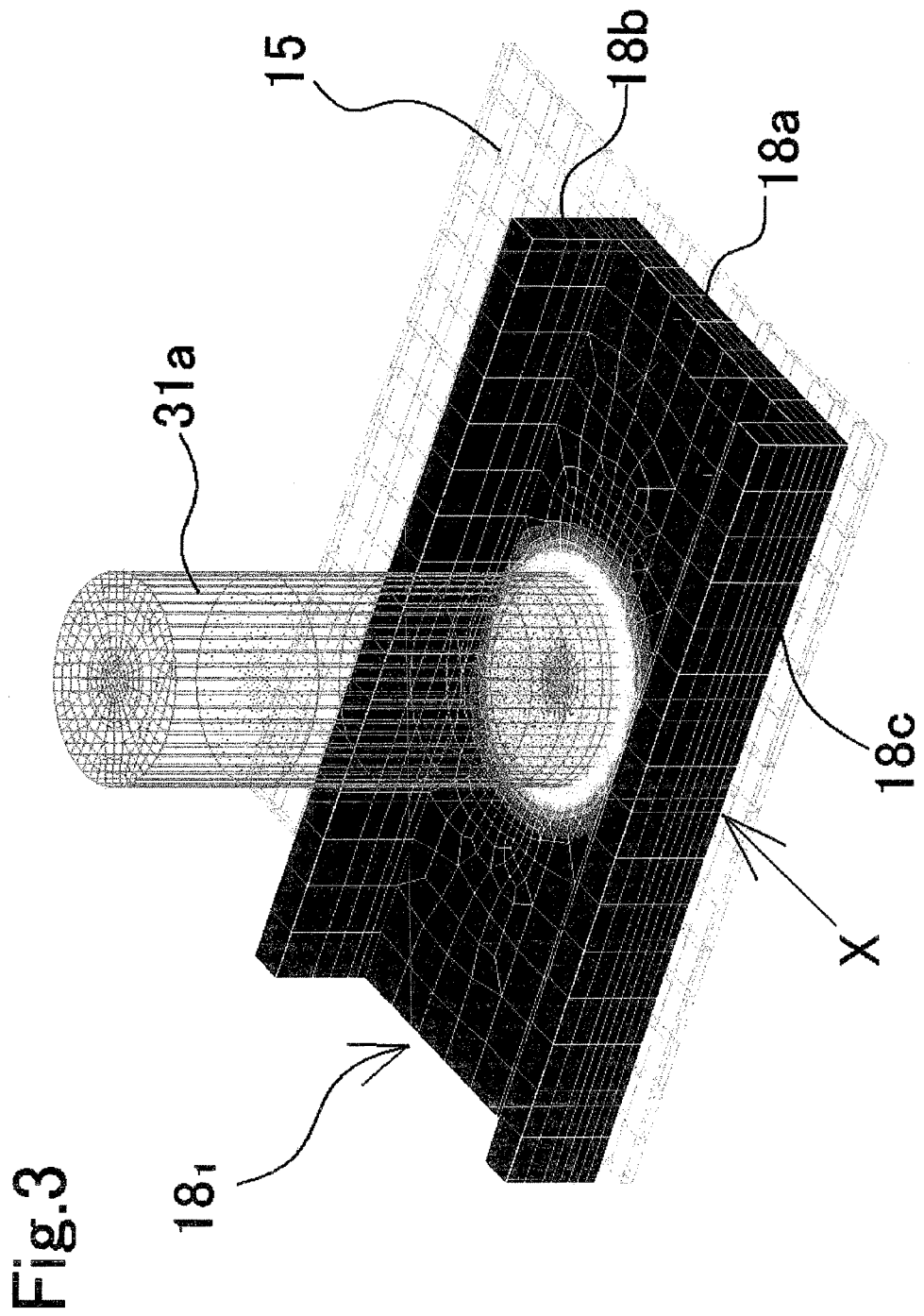
FIG. 3 is a computer simulation view showing the temperature distribution of resistance welds in the sealed battery according to a first embodiment viewed from above.
Figure 6:
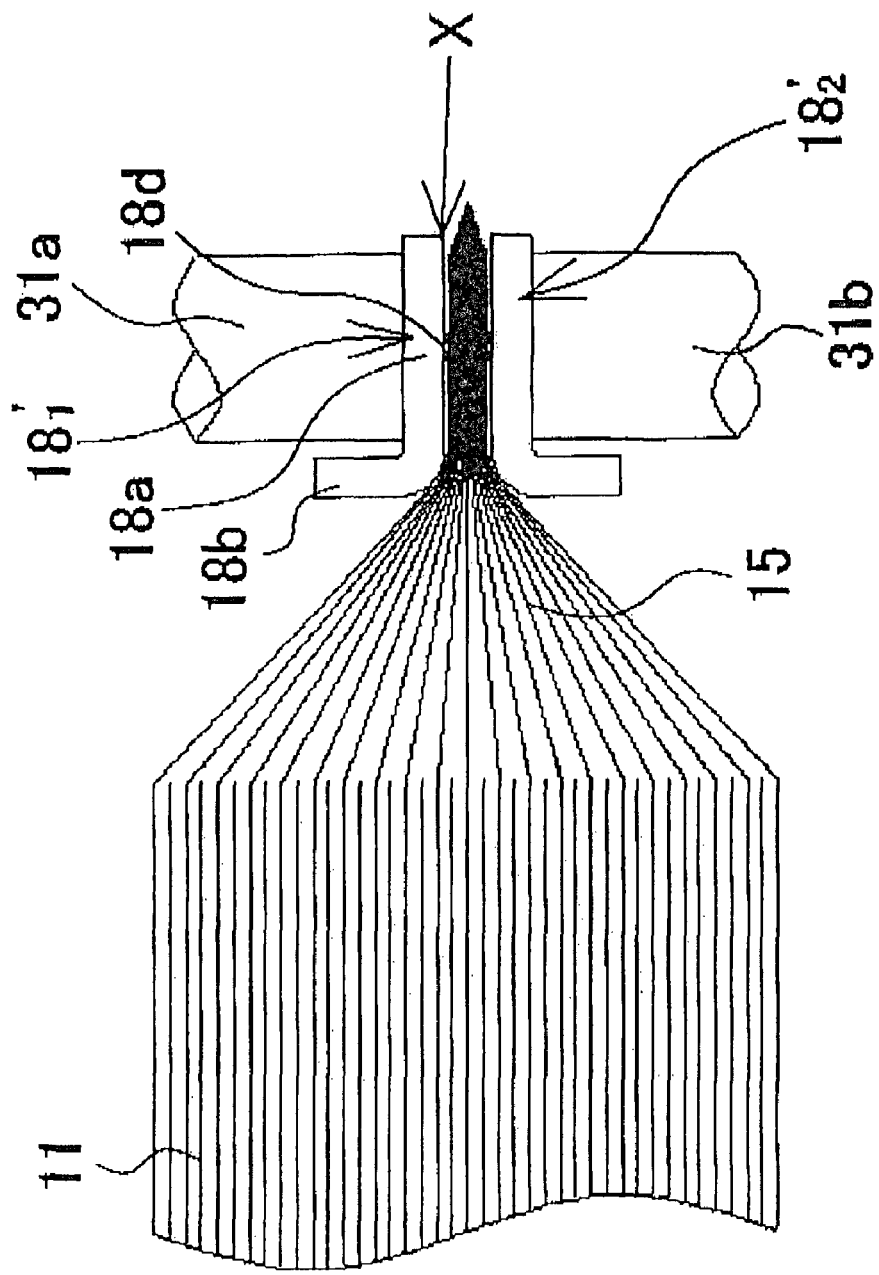
FIG. 6 is an enlarged cross-sectional view, along line II-II in FIG. 1A, of the sealed battery according to a first comparative example.
Figure 7:
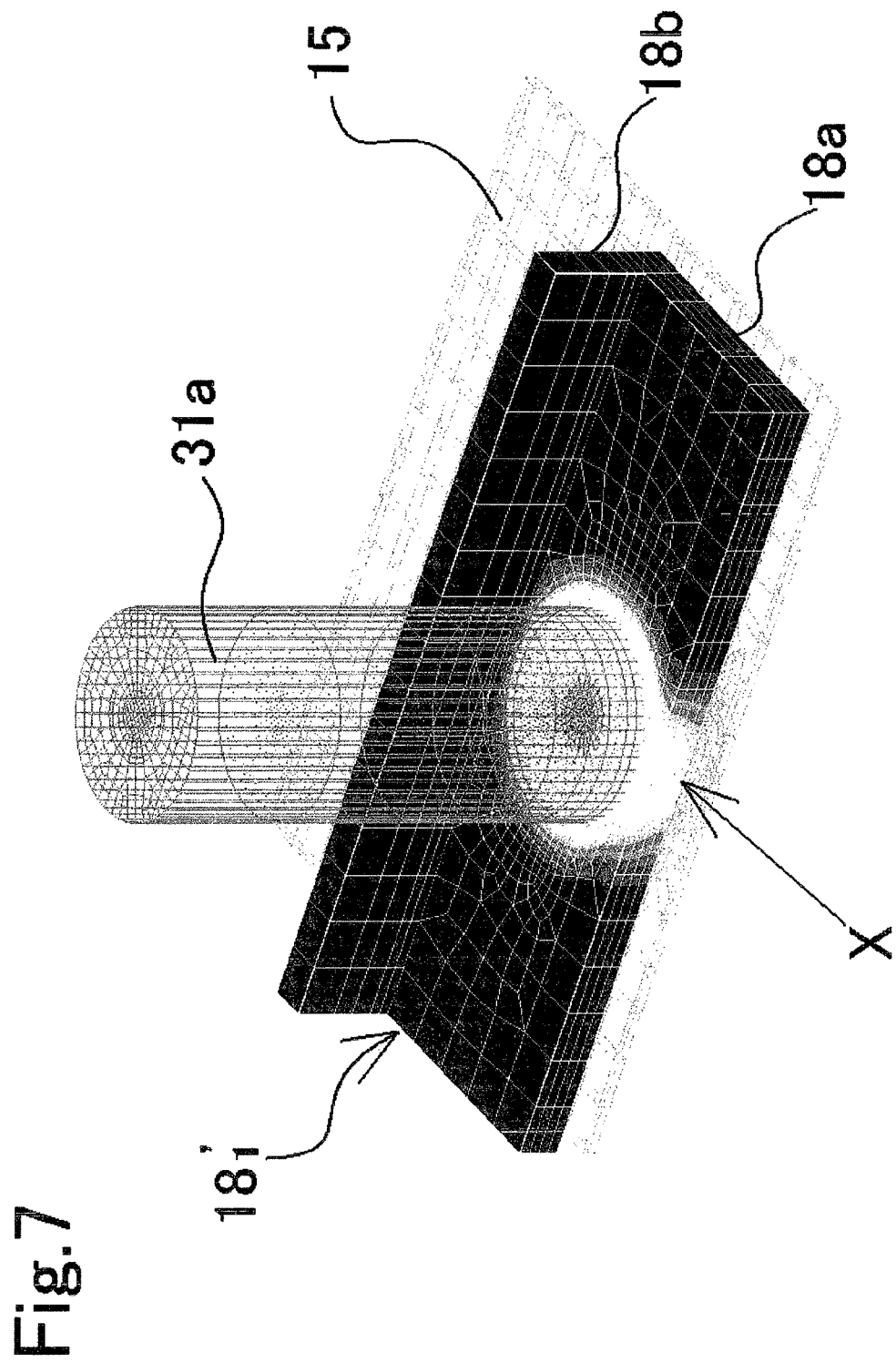
FIG. 7 is a computer simulation view showing the temperature distribution of resistance welds in the sealed battery according to the first comparative example viewed from above.
Figure 8:
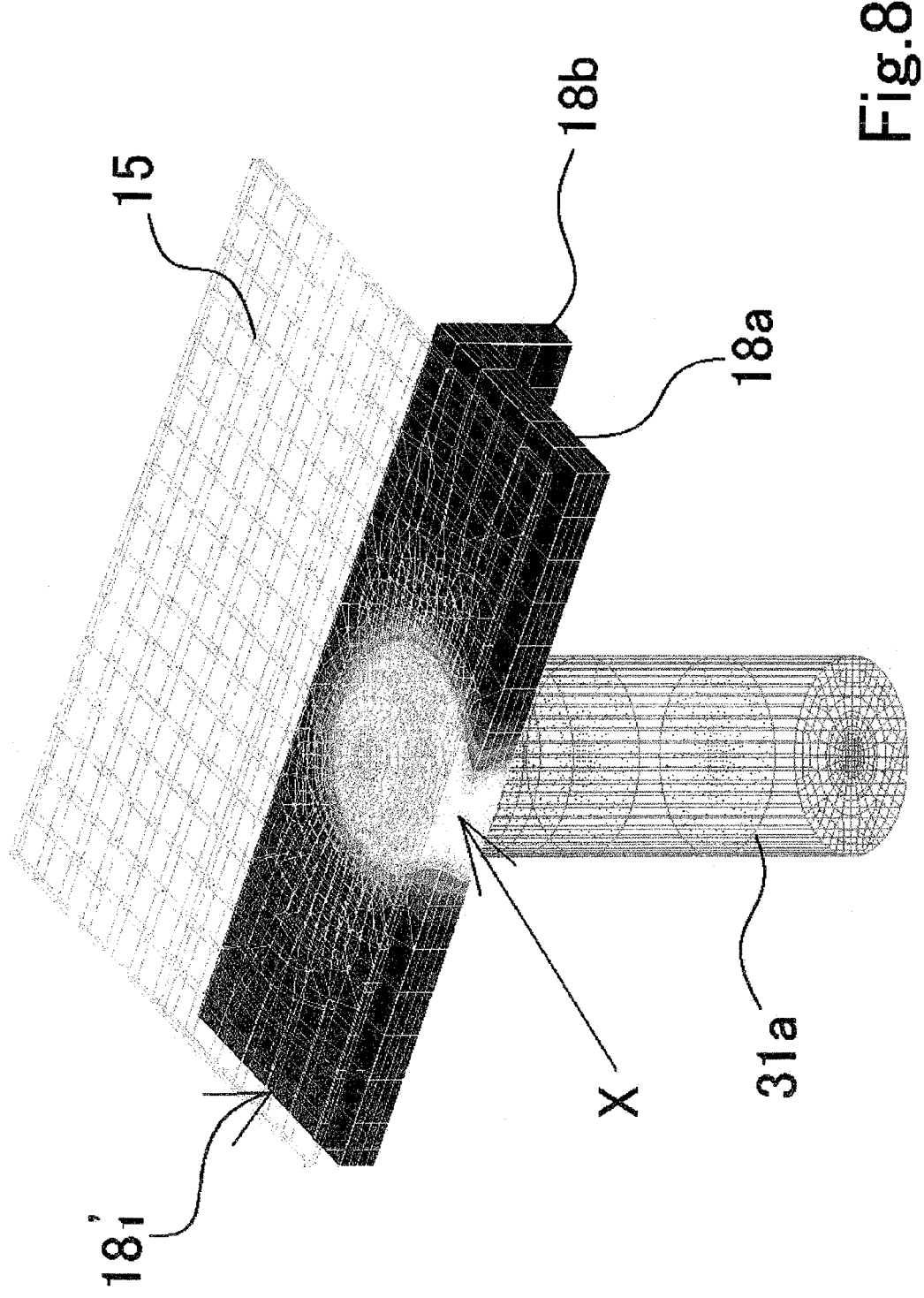
FIG. 8 is a computer simulation view showing the temperature distribution of resistance welds in the sealed battery according to the first comparative example viewed from below.
Figure 9:
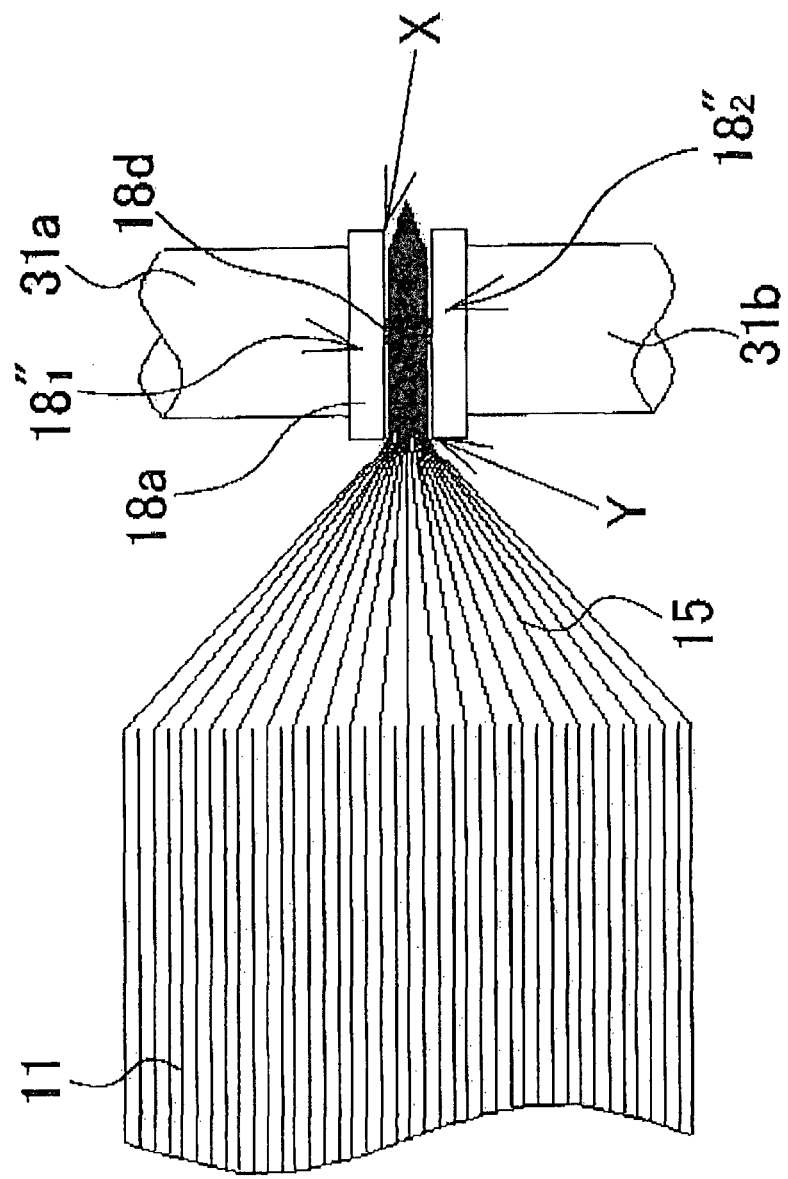
FIG. 9 is an enlarged cross-sectional view, along line II-II in FIG. 1A, of the sealed battery according to a second comparative example.
Figure 10:
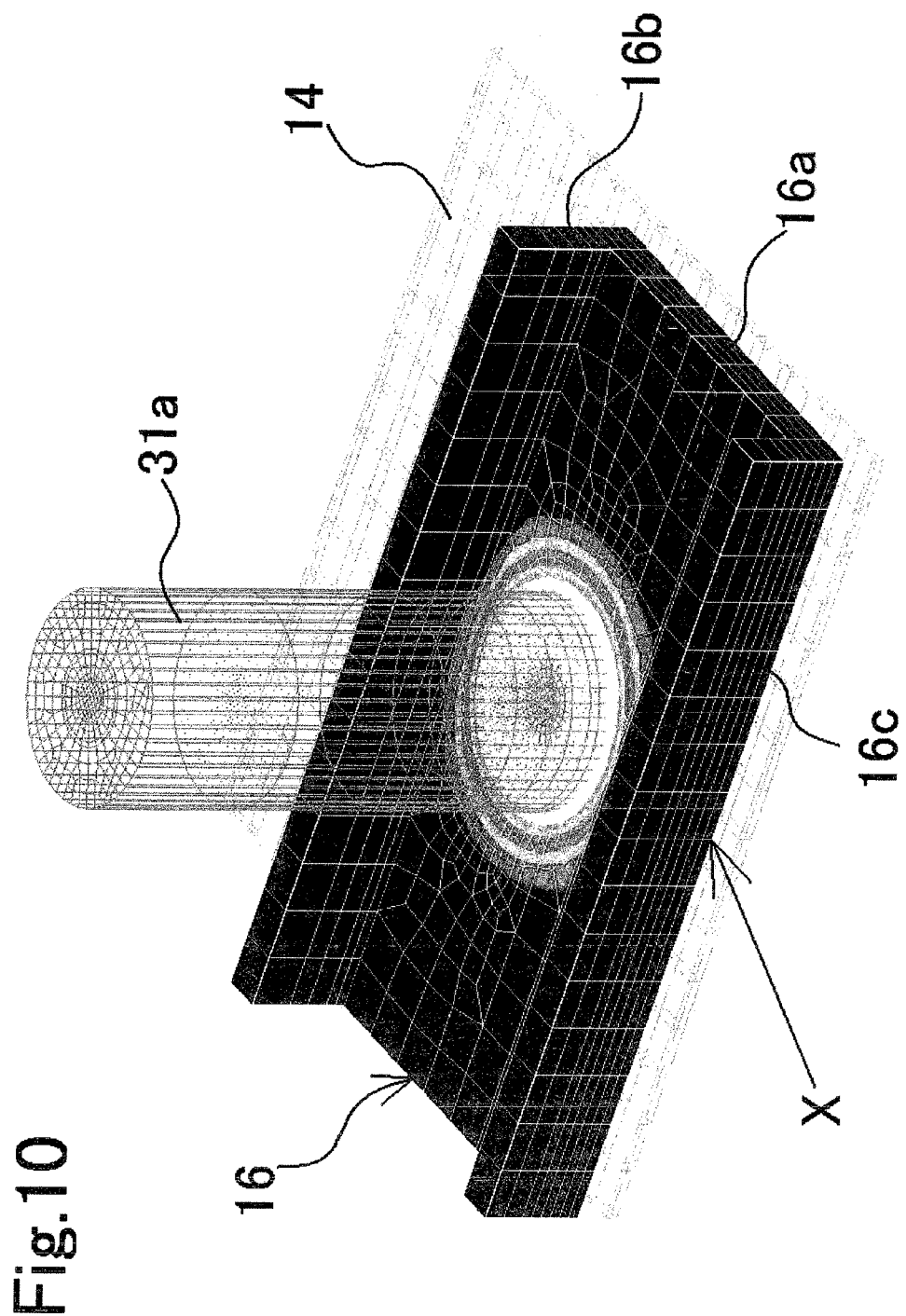
FIG. 10 is a computer simulation view showing the temperature distribution of resistance welds in the sealed battery according to a second embodiment viewed from above.
Figure 11:
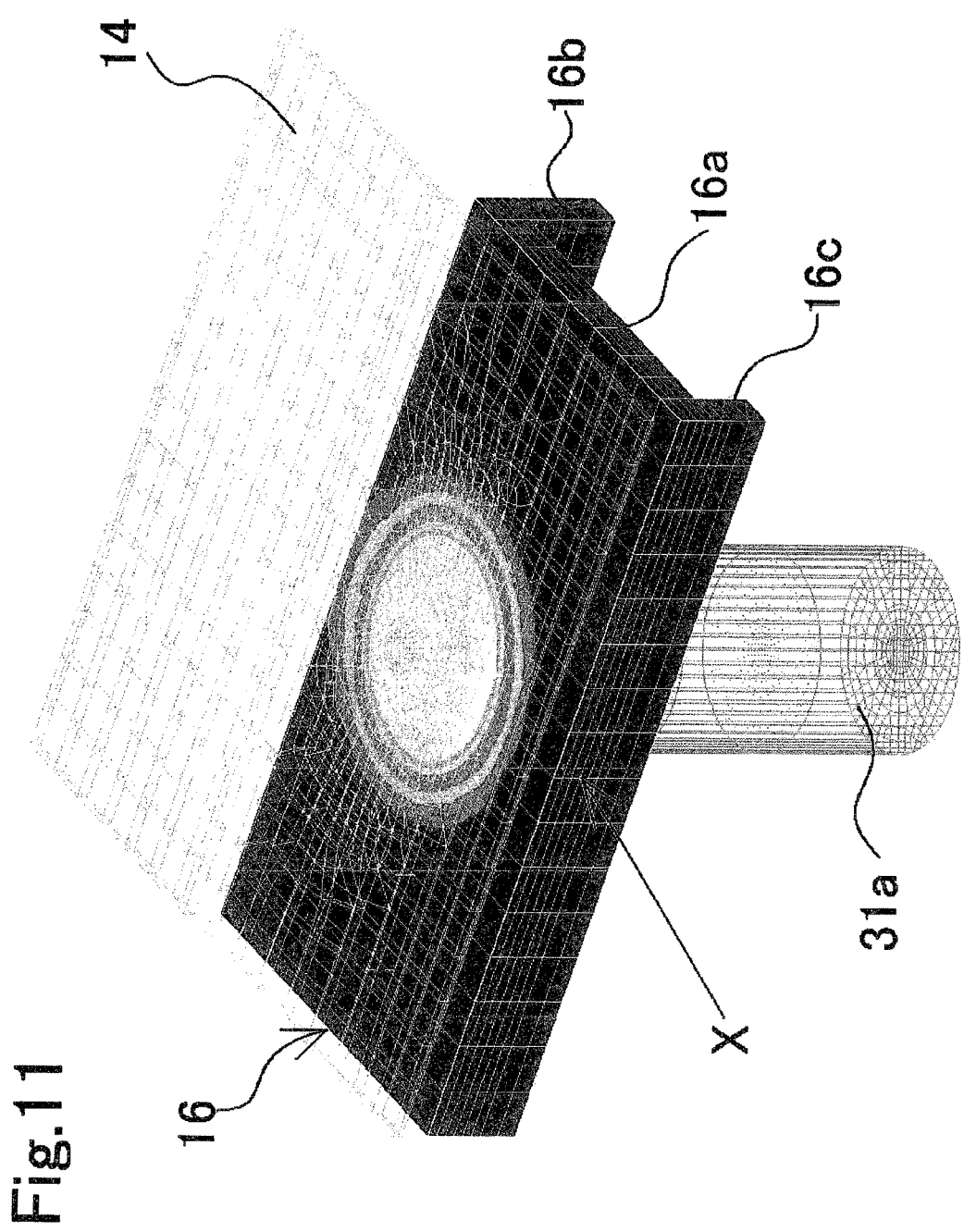
FIG. 11 is a computer simulation view showing the temperature distribution of resistance welds in the sealed battery according to the second embodiment viewed from below.
Figure 12:
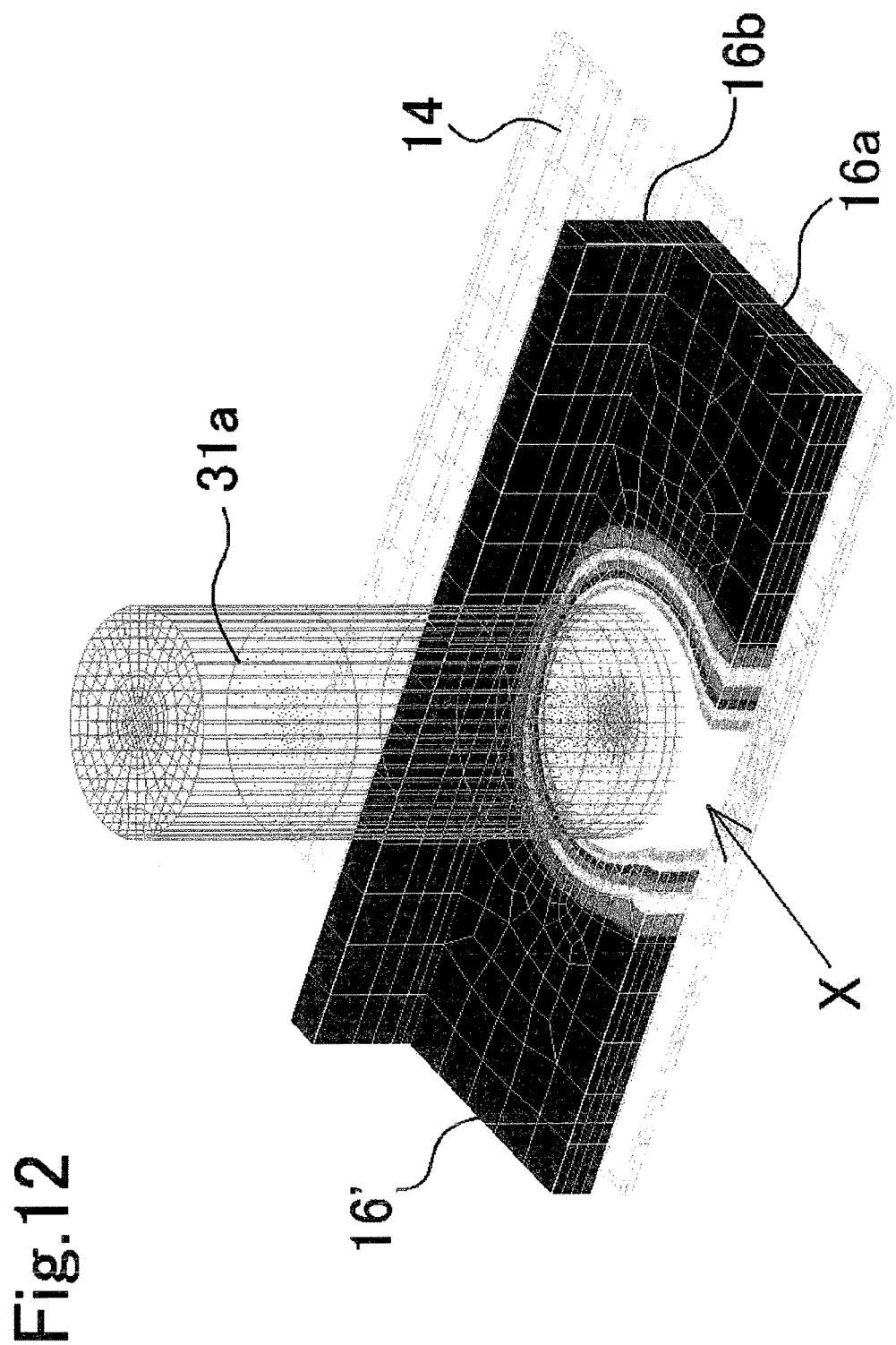
FIG. 12 is a computer simulation view showing the temperature distribution of resistance welds in the sealed battery according to a third comparative example viewed from above.
Figure 13:
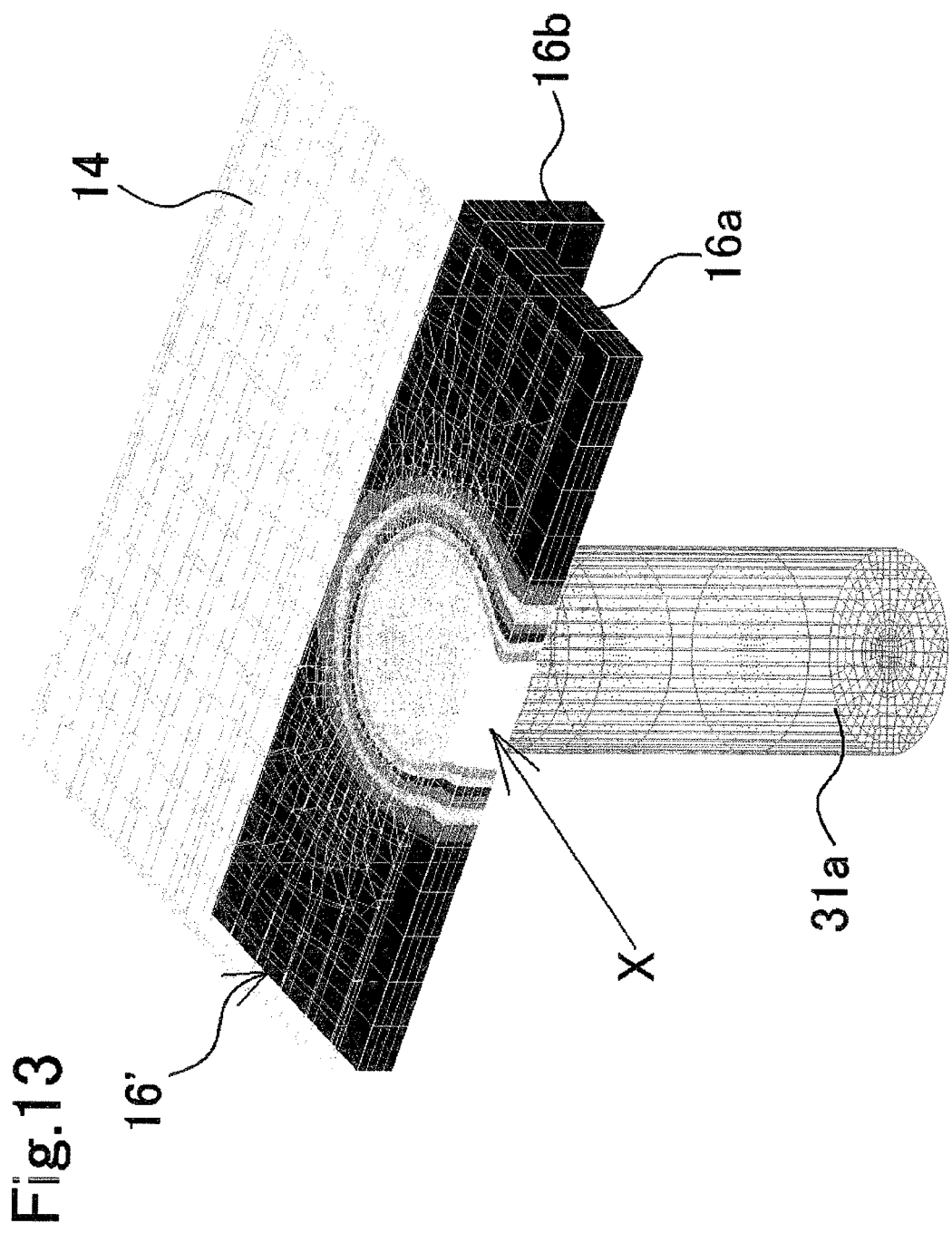
FIG. 13 is a computer simulation view showing the temperature distribution of resistance welds in the sealed battery according to the third comparative example viewed from below.

FIG. 1A is a front view illustrating the internal structure of a sealed battery according to an embodiment of the present invention, and FIG. 1B is a cross-sectional view along line IB-IB in FIG. 1A. FIG. 2 is an enlarged cross-sectional view, along line II-II in FIG. 1A, of the sealed battery according to the embodiment. FIG. 3 is a computer simulation view showing the temperature distribution of resistance welds in the sealed battery according to a first embodiment viewed from above. FIG. 4 is a computer simulation view showing the temperature distribution of resistance welds in the sealed battery according to the first embodiment viewed from below. FIGS. 5A to 5C are cross sectional views showing a collector and collector receiving part applicable to the invention. FIG. 6 is an enlarged cross-sectional view, along line II-II in FIG. 1A, of the sealed battery according to a first comparative example. FIG. 7 is a computer simulation view showing the temperature distribution of resistance welds in the sealed battery according to the first comparative example viewed from above. FIG. 8 is a computer simulation view showing the temperature distribution of resistance welds in the sealed battery according to the first comparative example viewed from below. FIG. 9 is an enlarged cross-sectional view, along line II-II in FIG. 1A, of the sealed battery according to a second comparative example. FIG. 10 is a computer simulation view showing the temperature distribution of resistance welds in the sealed battery according to a second embodiment viewed from above. FIG. 11 is a computer simulation view showing the temperature distribution of resistance welds in the sealed battery according to the second embodiment viewed from below. FIG. 12 is a computer simulation view showing the temperature distribution of resistance welds in the sealed battery according to a third comparative example viewed from above. FIG. 13 is a computer simulation view showing the temperature distribution of resistance welds in the sealed battery according to the third comparative example viewed from below.

First of all a sealed nonaqueous electrolyte secondary battery that is common to the embodiments and comparative examples below will be described using FIGS. 1A and 1B. In this sealed nonaqueous electrolyte secondary battery 10, a flat wound electrode assembly 11, which is made up of positive electrode plates (not shown in the drawings) and negative electrode plates (not shown in the drawings) wound with separators (not shown in the drawings) interposed, is housed inside a rectangular outer can 12, and the outer can 12 is sealed by a sealing plate 13.

The flat wound electrode assembly 11 has, at one end in the winding axis direction, positive electrode substrate exposed portions 14 to which a positive electrode mixture is not applied, and at the other end, negative electrode substrate exposed portions 15 to which a negative electrode mixture is not applied. The positive electrode substrate exposed portions 14 are connected to a positive electrode terminal 17 via a positive electrode collector 16 and the negative electrode substrate exposed portions 15 are connected to a negative electrode terminal 19 via a negative electrode collector 18₁. The positive electrode terminal 17 and the negative electrode terminal 19 are fixed to the sealing plate 13 via insulating members 20 and 21, respectively.

To fabricate this prismatic nonaqueous electrolyte secondary battery, the flat wound electrode assembly 11 is inserted into the outer can 12, then the sealing plate 13 is laser-welded over the mouth portion of the outer can 12, after which the nonaqueous electrolyte is poured in through an electrolyte pour hole (not shown in the drawings) and the electrolyte pour hole is sealed up. An example of the electrolyte may include a solution of ethylene carbonate and diethyl carbonate mixed in the proportion 3:7 by volume, into which 1 mole/L of LiPF$_6$ is dissolved to produce a nonaqueous electrolyte.

Next is described the specific manufacturing method for the flat wound electrode assembly 11, which is common to the embodiment and comparative examples.

Fabrication of Positive Electrode Plates

The positive electrode plates are fabricated as follows. First of all, lithium cobalt oxide (LiCoO$_2$) powder serving as the positive electrode active material, carbon-based powder such as acetylene black or graphite serving as the conducting material, and binding agent constituted of polyvinylidene-fluoride (PVdF) are mixed in the proportions 94%, 3% and 3% by mass. Then an organic solvent constituted of N-methyl-2-propylene (NMP) pyrrolidone is added to the resulting mixture and stirred in to form positive electrode active material mixture slurry. Next, a positive electrode substrate constituted of aluminum foil (e.g., 20" m thick) is prepared, and the positive electrode active material mixture slurry made in the foregoing manner is applied evenly over both surfaces of the positive electrode substrate to form positive electrode active material mixture layers. The positive electrode active material is applied in such a manner that in the positive electrode active material mixture layer on one surface, a bare portion (positive electrode substrate exposed portion) of a particular width (12 mm in this example) where the slurry is not applied is formed along the edge of the positive electrode substrate. After that, the positive electrode substrate with the positive electrode active material mixture layers formed thereon is passed through a drier, where the NMP that was needed during fabrication of the slurry is removed and the substrate is dried. After such drying, the substrate is rolled in a roll press into a positive electrode plate of thickness 0.06 mm. The positive electrode plate thus fabricated is then cut into a strip 100 mm wide, so that a positive electrode plate is obtained that is provided with a 10 mm wide strip-form exposed portion of aluminum positive electrode substrate.

Fabrication of Negative Electrode Plates

The negative electrode plates are fabricated as follows. First of all, natural graphite powder serving as the negative electrode active material, and carboxymethyl cellulose (CMC) and styrene-butadiene rubber (SBR) serving as binding agents, are mixed in the proportions 98%, 1% and 1% by mass. Then water is added and the mixture is stirred to produce a negative electrode active material mixture slurry. Next, a negative electrode substrate constituted of copper foil (e.g., 12" m thick) is prepared, and the negative electrode active material mixture slurry made in the foregoing manner is applied evenly over both surfaces of the negative electrode substrate to form negative electrode active material mixture layers. The negative electrode active material is applied in such a manner that in the negative electrode active material mixture layer on one surface, a bare portion (negative electrode substrate exposed portion) of a particular width (10 mm in this example) where the slurry is not applied is formed along the edge of the negative electrode substrate. After that, the negative electrode substrate with the negative electrode active material mixture layers formed thereon is passed through a drier and dried. After such drying, the substrate is rolled in a roll press into a negative electrode plate of thickness 0.05 mm. The negative electrode plate thus fabricated is then cut into a strip 110 mm wide, so that a negative electrode plate is obtained that is provided with an 8 mm wide strip-form exposed portion of negative electrode substrate.

Fabrication of Wound Electrode Assembly

First, the positive electrode substrate exposed portions of the positive electrode plates, and negative electrode substrate exposed portions of the negative electrode plates, that were obtained in the foregoing manner, are displaced so as not to overlie the electrode active material mixture layers that are respectively opposed to them, and then the electrode plates are wound, with porous polyethylene separators (0.022 mm thick and 100 mm wide) interposed, to produce a flat wound electrode assembly 11 which has multiple positive electrode substrate exposed portions 14 constituted of aluminum foil formed at one end and negative electrode substrate exposed portions 15 constituted of copper foil at the other, and which is used in the embodiment and comparative examples. While the numbers of substrates at the positive electrode substrate exposed portions 14 and the negative electrode substrate exposed portions 15 vary depending on the designed capacity of the wound electrode assembly 11, the substrates are typically in the form of several dozens to several hundreds of stacked layers.

Resistance Welding of Collectors

A negative electrode collector $18_1$ and a negative electrode collector receiving part $18_2$ made of copper are attached by resistance welding to the negative electrode substrate exposed portions 15 of the flat wound electrode assembly 11 fabricated in the foregoing manner. For each of the first embodiment, the first comparative example, and second comparative example, the resistance welding is performed with the forms of the copper negative electrode collector $18_1$ and the negative electrode collector receiving part $18_2$ changed. Since the negative electrode collector $18_1$ and the negative electrode collector receiving part $18_2$ have the same forms and sizes for each of the first embodiment, the first comparative example, and second comparative example, the specific structure of the negative electrode collector $18_1$ is described as a representative example below.

First Embodiment

As shown in FIG. 2, the copper negative electrode collector $18_1$ used in the first embodiment includes: a planar part 18a contacted with the negative electrode substrate exposed portions 15; a first bent part 18b extending from the planar part 18a and bent at the bottom side (the wound electrode assembly 11 side) of the negative electrode substrate exposed portions 15 into an upward direction away from the negative electrode substrate exposed portions 15; and a second bent part 18c bent upward at the leading side of the negative electrode substrate exposed portions 15. This negative electrode collector $18_1$ has a substantially widened U-shaped cross section, and both the outer surface of a boundary part between the planar part 18a and the first bent part 18b and the outer surface of a boundary part between the planar part 18a and the second bent part 18c are rounded off (in a curved state). The negative electrode collector $18_1$ has a thickness of 1.2 mm and in the central part of the planar part 18a of the negative electrode collector $18_1$, a projection 18d having a height of 0.2 mm and projecting toward the negative electrode collector receiving part $18_2$ side is formed.

The negative electrode substrate exposed portions 15 are sandwiched between the copper negative electrode collector $18_1$ and negative electrode collector receiving part $18_2$ having the same form and same size so that the projections 18d formed on their planar parts 18a are opposed to each other. The sandwiching is performed with the first bent parts 18b of the negative electrode collector $18_1$ and the negative electrode collector receiving part $18_2$ put on the side of the wound electrode assembly 11. In other words, as shown in FIG. 2, the negative electrode substrate exposed portions 15 are stacked so that they have a tapered thickness from the side of the wound electrode assembly 11 having a larger thickness. Therefore, by putting the first bent parts 18b of the negative electrode collector $18_1$ and the negative electrode collector receiving part $18_2$ on the side of the wound electrode assembly 11, the rounded-off outer surface of the boundary part between the planar parts 18a and the first bent parts 18b is abut on the negative electrode substrate exposed portions 15, whereby the negative electrode collector $18_1$ and the negative electrode collector receiving part $18_2$ can be reliably positioned.

In the above-described state, resistance welding is performed by pressing the negative electrode collector $18_1$ and the negative electrode collector receiving part $18_2$ from both sides with a pair of electrode bars for resistance welding 31a and 31b of a resistance welding apparatus (not shown) and by applying a predetermined current. The pair of electrode bars for resistance welding 31a and 31b are made of copper or a copper alloy. To prevent them from coming in contact with the first bent parts 18b and the second bent parts 18c of the negative electrode collector $18_1$ and the negative electrode collector receiving part $18_2$, electrode bars having a width slightly smaller than that of the planer parts 18a will be employed.

The electrode bars for resistance welding 31a and 31b are made as thick as possible corresponding to the sizes of the negative electrode collector $18_1$ and the negative electrode collector receiving part $18_2$, because due to a limited volume of the sealed battery, the sizes of the negative electrode collector $18_i$ and the negative electrode collector receiving part $18_2$ cannot be freely enlarged, and because when the electrode bars for resistance welding 31a and 31b are thin, during the resistance welding, a large current as $100 \text{ A/mm}^2$ ($10 \text{ kA/cm}^2$) or more flows in a short time, so that the electrode bars for resistance welding 31a and 31b themselves become molten.

Here, the length of the first bent part 18b and the second bent part 18c of the negative electrode collector $18_1$ and the negative electrode collector receiving part $18_2$, which is substantially the length L between the edge part of the electrode bar for resistance welding 31a or 31b and the edge part of the first bent part 18b or the second bent part 18c, is 2 mm. Using the thus-configured negative electrode collector $18_1$, negative electrode collector receiving part $18_2$ and electrode bars for resistance welding 31a and 31b, resistance welding was performed by applying a current of $300 \text{ A/mm}^2$ in a short time and it was confirmed that the resistance welding can be advantageously performed. Here, for securing mechanical strength and for reducing the inner resistance value of the battery, the resistance welding is preferably performed at two or more points.

Here, for reconfirming the advantageous effects of the first embodiment of the invention by way of caution, the temperature distribution during the welding was calculated by a simulation using a finite element method and the results thereof are shown in FIGS. 3 and 4. In FIGS. 3 and 4, white parts have the highest temperature and black parts have the lowest temperature. From the results shown in FIGS. 3 and 4, it could be confirmed that temperature rise at an edge part X of the negative electrode collector $18_1$ was prevented and the thermal balance between the first bent part 18b and the second bent part 18c was homogenized.

While in the first embodiment, the negative electrode collector $18_1$ and the negative electrode collector receiving part $18_2$ each have a thickness of 1.2 mm, the thickness may be appropriately selected from the range of 0.1 mm to 5 mm. When the thickness of the negative electrode collector $18_1$ or the negative electrode collector receiving part $18_2$ is less than 0.1 mm, they become molten over a wide range during resistance welding. On the other hand, when the thickness is more than 5 mm, they become unlikely to be molten during resistance welding, so that a large current density becomes necessary. Further, though the height of the projections 18d formed in the central parts of the planar parts 18a of the negative electrode collector $18_1$ and the negative electrode collector receiving part $18_2$ was caused to be 0.2 mm, an advantageous electro-current constriction action can be exhibited as long as the height of the projection 18d is 0.2 mm or more. The optimal upper limit of the height of the projection 18d varies depending on the thickness (or the number of the stacked layers) of the negative electrode substrate exposed portions 15 arranged between the negative electrode collector $18_1$ and the negative electrode collector receiving part $18_2$, and may be around 0.5 to 1 mm. Further, in the first embodiment, though the negative electrode collector $18_1$ and the negative electrode collector receiving part $18_2$ each have the first bent part 18b and second bent part 18c each having the length L=2 mm, advantageous effects as a radiating fin can be obtained as long as the length L is 1 mm or more. The longer this length L, the better. However, the space volume of the sealed battery is limited, and a too large length is not preferred due to potential short-circuits between the bent parts and the battery outer can of the sealed battery.

Further, though in the first embodiment, the negative electrode collector $18_1$ and the negative electrode collector receiving part $18_2$ have a cross sectional form of a widened U-shape as an example, the cross sectional form is not limited thereto and also the cross sectional forms shown in FIGS. 5A to 5C can be used. Any case will do as long as the first bent part 18b at the bottom side (on the wound electrode assembly 11 side) of the negative electrode substrate exposed portions 15 is bent in an upward direction away from the negative electrode substrate exposed portions 15, and the second bent part 18c may be bent in any direction so long as it does not come in direct contact with the negative electrode substrate exposed portions 15.

First Comparative Example

In the first comparative example, resistance welding was performed as shown in FIG. 6 in substantially the same manner as in the first embodiment, except that a negative electrode collector $18_1'$ and a negative electrode collector receiving part $18_2'$ were produced by removing the second bent parts 18c from each of the negative electrode collector $18_1$ and the negative electrode collector receiving part $18_2$ used in the first embodiment. In this case, since the second bent part 18c was not present, heat radiation at this part became unsatisfactory, so that the edge parts X of the negative electrode collector $18_1$ (and the negative electrode collector receiving part $18_2$) became molten and the negative electrode collector $18_1'$ (and the negative electrode collector receiving part $18_2'$) and the resistance welding bar 31a (and 31b) were fusion-bonded to each other. Thus, when the edge part X becomes molten, the part is discolored and there is caused such a probability that conductive metal particles having been generated by the molten metal or spark invade into the inside of the wound electrode assembly 11 to cause internal short-circuits.

Here, for reconfirming the advantageous effects of the first comparative example by way of caution, the temperature distribution during the welding was calculated by a simulation using the finite element method and the results thereof are shown in FIGS. 7 and 8. From the results shown in FIGS. 7 and 8, it could be confirmed that while on the side of the first bent part 18b of the negative electrode collector $18_1'$, thanks to an advantageous heat radiation effect, temperature rise was suppressed, the edge part X side reached a high temperature at the same level as that in the resistance welds. Consequently, the edge part X of the negative electrode collector $18_1'$ and the top part of the negative electrode substrate exposed portions 15 were fusion-bonded. Since the negative electrode collector $18_1'$ became of a high temperature beyond necessity, the electrode bar for resistance welding 31a and the negative electrode collector $18_1'$ were also fusion-bonded.

Second Comparative Example

In the second comparative example, resistance welding was performed as shown in FIG. 9 in substantially the same manner as in the first embodiment, except that a negative electrode collector $18_1''$ and a negative electrode collector receiving part $18_2''$ were produced by removing the first and second bent parts 18b, 18c from the negative electrode collector $18_1$ and the negative electrode collector receiving part $18_2$, respectively, used in the first embodiment. In this case, since the first and second bent parts 18b, 18c were not present, heat radiation at these parts became unsatisfactory, so that the edge part X of the negative electrode collector $18_1''$ became molten, and an edge part Y on the wound electrode assembly 11 side of the negative electrode collector $18_1''$ became molten, as well as the negative electrode collector $18_1'$ and the resistance welding bar 31a were fusion-bonded to each other. Particularly, when the edge part Y on the wound electrode assembly 11 side of the negative electrode collector $18_1''$ becomes molten, the bottom side of the negative electrode substrate exposed portions 15 becomes molten to cause a hole, and further, such a probability becomes larger that conductive metal particles having been generated by the molten metal or spark invade into the inside of the wound electrode assembly 11 to cause internal short-circuits.

Second Embodiment

As the second embodiment of the invention, an experiment was performed using as an aluminum positive electrode collector 16 and positive electrode collector receiving part connected to the aluminum positive electrode substrate exposed portions 14, those having a planar part 16a, a first bent part 16b and a second bent part 16c in the same form as those in the first embodiment. For reconfirming the advantageous effects of the second embodiment, the temperature distribution during the welding was calculated by a simulation using the finite element method and the results thereof are shown in FIGS. 10 and 11. In FIGS. 10 and 11, white parts have the highest temperature and black parts have the lowest temperature. From the results shown in FIGS. 10 and 11, it could be confirmed that temperature rise at the edge part X of the positive electrode collector 16 was prevented and the thermal balance between the first bent part 16b and the second bent part 16c was homogenized. Thus, it is apparent that also with respect to aluminum positive electrode collectors, the same advantageous effect as that in the first embodiment can be obtained.

Third Comparative Example

As the third comparative example, an experiment was performed using an aluminum positive electrode collector 16' and positive electrode collector receiving part connected to the aluminum positive electrode substrate exposed portions 14 in the same forms as those in the first comparative example. For reconfirming the advantageous effects of the third comparative example, the temperature distribution during the welding was calculated by a simulation using the finite element method and the results thereof are shown in FIGS. 12 and 13. From the results shown in FIGS. 12 and 13, it could be confirmed that though since on the first bent part 16b side of the positive electrode collector 16', thanks to a satisfactory heat radiation effect, temperature rise was suppressed, the edge part X side reached a high temperature at the same level as that in the resistance-welds. Consequently, the edge part X of the positive electrode power collecting body 16' and the top part of the positive electrode substrate exposed portions 14 were fusion-bonded. Since the temperature of the positive electrode collector 16' became high beyond necessity, the electrode bar for resistance welding 31a and the positive electrode collector 16' were also fusion-bonded.

Here, since copper (copper alloy) has a smaller electrical resistance and larger thermal conductivity than those of aluminum (aluminum alloy), when the substrates, collectors and power collector receiving parts are made of copper or a copper alloy, the advantageous effects of the invention are more remarkably exhibited.

While in the embodiments, a wound electrode assembly is made up of positive electrode plates and negative electrode plates wound in a flat spiral with separators interposed, a secondary battery according to other embodiments of the invention provided with a multi-layered electrode assembly made up of positive electrode plates and negative electrode plates stacked with separators interposed can also provide the same functions and effects.

What is claimed is:

1. A sealed battery comprising:
    a flat electrode assembly having a plurality of positive electrode substrates exposed at one end and a plurality of negative electrode substrates exposed at the other end; and
    a collector and a collector receiving part which are attached to both sides of at least one of the plurality of positive electrode substrates and the plurality of negative electrode substrates,
    at least one of the positive electrode substrates and the negative electrode substrates, the collector and the collector receiving part each being made of copper or a copper alloy or made of aluminum or an aluminum alloy,
    the collector and the collector receiving part each having:
        a planar part including a part in contact with and resistance-welded to the corresponding substrates;
        a first bent part extending from the planar part and bent at a bottom side of the substrates into a direction away from the substrates; and
        a second bent part provided at a leading side of the substrates; and
    the second bent part of the collector and the second bent part of the collector receiving part at the leading side of the substrates being allocated at positions away from each other;
    the collector and the collector receiving part each having an edge part at a bent direction of the second bent part; and
    wherein the edge part at the bent direction of the second bent part of the collector and the edge part at the bent direction of the second bent part of the collector receiving part are not connected directly at the leading side of the substrate.

2. The sealed battery according to claim 1, wherein the negative electrode substrates, the collector and the collector receiving part which are attached to both sides of the plurality of negative electrode substrates are each made of copper or a copper alloy.

3. The sealed battery according to claim 1, wherein the collector and the collector receiving part have the same thickness and the same shape.

4. The sealed battery according to claim 1, wherein the planar part of at least one of the collector and the collector receiving part is provided with a protrusion projecting toward the other planar part.

5. The sealed battery according to claim 1, wherein the planar parts of the collector and the collector receiving part each have at least two resistance welds.

6. The sealed battery according to claim 1, wherein the sealed battery is a lithium ion nonaqueous electrolyte secondary battery.

7. A method for manufacturing a sealed battery, the method comprising:
    (1) forming a flat electrode assembly having exposed portions of a plurality of aluminum or aluminum alloy positive electrode substrates at one end and a plurality of copper or copper alloy negative electrode substrates at the other end,
    (2) arranging a collector and a collector receiving part each made of one of copper, copper alloy, aluminum, and aluminum alloy and each comprising: a planar part; a first bent part extending from the planar part and bent at the bottom side of the substrates into a direction away from the corresponding substrates; and a second bent part provided at the leading side of the substrates, so as to provide the collector at one end and the collector receiving part at the other end of welds in the exposed portions of at least one of the negative and positive electrode substrates with each planar part coming in contact with the substrates, and
    (3) resistance-welding the collector and the collector receiving part by applying a current between electrode bars for resistance welding with the collector and the collector receiving part depressed to each other with the electrode bars for resistance welding,
    the second bent part of the collector and the second bent part of the collector receiving part at the leading side of the substrates being allocated at positions away from each other;
    the collector and the collector receiving part each having an edge part at a bent direction of the second bent part; and
    wherein the edge part at the bent direction of the second bent part of the collector and the edge part at the bent direction of the second bent part of the collector receiving part are not connected directly at the leading side of the substrate.

8. The method for manufacturing a sealed battery according to claim 7, wherein
    in the (2) process, the planar part of at least one of the collector and the collector receiving part is provided with a protrusion projecting toward the other planar part, and
    in the (3) process, the resistance welding is performed by applying a current having a current density of 100 A/mm$^2$ or more.

9. The sealed battery according to claim 1, wherein the second bent part is bent in a direction away from the substrates.

10. The method of manufacturing a sealed battery according to claim 7, wherein the second bent part is bent in a direction away from the substrates.

* * * * *